US008539339B2

(12) United States Patent
Lloyd et al.

(10) Patent No.: US 8,539,339 B2
(45) Date of Patent: *Sep. 17, 2013

(54) SYNTHETIC NAVIGATION ELEMENTS FOR ELECTRONIC DOCUMENTS

(75) Inventors: Zachary Lloyd, Brooklyn, NY (US); Dennis J. Lee, New York, NY (US); Joseph Schorr, New York, NY (US)

(73) Assignee: Google Inc., Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/084,983

(22) Filed: Apr. 12, 2011

(65) Prior Publication Data

US 2011/0252299 A1    Oct. 13, 2011

Related U.S. Application Data

(60) Provisional application No. 61/323,313, filed on Apr. 12, 2010.

(51) Int. Cl.
   G06F 17/00    (2006.01)

(52) U.S. Cl.
   USPC .......................................... 715/234; 715/212

(58) Field of Classification Search
   USPC .......................................... 715/234, 200, 212
   See application file for complete search history.

(56) References Cited

U.S. PATENT DOCUMENTS

| | | | |
|---|---|---|---|
| 6,988,241 B1* | 1/2006 | Guttman et al. | 715/220 |
| 7,017,112 B2* | 3/2006 | Collie et al. | 715/212 |
| 7,213,199 B2* | 5/2007 | Humenansky et al. | 715/209 |
| 7,506,242 B2* | 3/2009 | Kotler et al. | 715/209 |
| 2003/0014406 A1* | 1/2003 | Faieta et al. | 707/5 |
| 2004/0100509 A1* | 5/2004 | Sommerer et al. | 345/864 |
| 2005/0273695 A1* | 12/2005 | Schnurr | 715/503 |
| 2006/0053383 A1* | 3/2006 | Gauthier et al. | 715/764 |
| 2006/0236261 A1 | 10/2006 | Forstall et al. | |
| 2007/0088897 A1* | 4/2007 | Wailes et al. | 711/3 |
| 2007/0156332 A1* | 7/2007 | Wailes et al. | 701/208 |
| 2008/0155060 A1* | 6/2008 | Weber et al. | 709/218 |
| 2008/0195969 A1 | 8/2008 | Brown et al. | |
| 2009/0183083 A1* | 7/2009 | Hedges | 715/738 |
| 2009/0210819 A1* | 8/2009 | Fujimoto et al. | 715/784 |
| 2010/0115394 A1 | 5/2010 | Oshima et al. | |
| 2010/0205520 A1* | 8/2010 | Parish et al. | 715/212 |
| 2011/0252335 A1* | 10/2011 | Lloyd et al. | 715/744 |
| 2012/0117452 A1* | 5/2012 | Lloyd et al. | 715/212 |

OTHER PUBLICATIONS

"What is dynamic HTML?" in Eric Ladd, Jim O'Donnell: *Platinum Edition Using HTML 4, XML, and Java 1.2*. Que: USA, XP-002661296, pp. 582-591 (Dec. 1998).
Michael Miller, ed., "Collaborating on Word Processing," in *Cloud Computing: Web-Based Applications that Change the Way You Work and Collaborate Online*, Chapter 11:[Safari tech books online] Que: Indianapolis, Indiana, XP002641103, pp. 147-164 (Aug. 11, 2008).
Authorized Officer D. Golze. International Search Report and Written Opinion in international application No. PCT/US2011/032053, dated Jan. 13, 2012, 13 pages.

* cited by examiner

*Primary Examiner* — Manglesh M Patel
(74) *Attorney, Agent, or Firm* — Wolff & Samson, PC

(57) ABSTRACT

A computer-implemented method for managing the display of items in a web-based document application includes providing an electronic document that includes a plurality of content items, anchoring a plurality of base layers to different discrete positions of the electronic document, and anchoring ones of the plurality of content items to particular ones of the base layers so that when the spreadsheet is scrolled on a computer display, the content items move with the spreadsheet by virtue of the anchoring of the content items to the base layers and the anchoring of the base layers to the spreadsheet.

23 Claims, 8 Drawing Sheets

SYNTHETIC NAVIGATION ELEMENTS FOR ELECTRONIC DOCUMENTS

CROSS-REFERENCE TO RELATED APPLICATIONS

This application claims priority to U.S. Provisional Application Ser. No. 61/323,313, filed on Apr. 12, 2010, entitled "Synthetic Navigation Elements for Electronic Documents," the entire contents of which are hereby incorporated by reference.

TECHNICAL FIELD

This document relates to systems and techniques for displaying items in an electronic document such as a browser-based spreadsheet.

BACKGROUND

Electronic spreadsheets—made up of a grid of cells having rows and columns—are powerful tools that enable tracking and manipulation of large amounts of organized financial, engineering, and other information. Spreadsheets can enable a user to establish formulas and other relationships between and among the cells that make up the spreadsheet so as to compute a variety of values. The content of a spreadsheet can be viewed (e.g., on screen or printed) in place, in the spreadsheet grid itself (as opposed to standard databases which may need to be run through a reporting structure in order to produce meaningful output). To make such output more meaningful and visually appealing, spreadsheet applications permit users to apply formatting to text, numbers and other values in a cell (e.g., selecting a number of significant digits to display after a decimal point, a font type and size, and the like).

SUMMARY

This document describes systems and techniques that may be used to manage how rich content is displayed and moved in a document such as a spreadsheet.

In one implementation, a computer-implemented method for managing the display of items in a web-based document application is disclosed. The method includes providing an electronic document that includes a plurality of content items, anchoring a plurality of base layers to different discrete positions of the electronic document, and anchoring ones of the plurality of content items to particular ones of the base layers so that when the spreadsheet is scrolled on a computer display, the content items move with the spreadsheet by virtue of the anchoring of the content items to the base layers and the anchoring of the base layers to the spreadsheet. The method can also include identifying a sub-area of a model for the spreadsheet to render to a document object model (DOM), and rendering content items that are anchored to base layers that cover the sub-area. The sub-area can be identified by selecting an area positionally around a current viewport that shows a small portion of the document in a web browser. Also, the base layers may cover an area and be rendered as transparent objects over a rendered version of the electronic document.

In certain aspects, the base layers are arranged to pan with the electronic document when a user of a computing device moves the electronic document within a viewport in a user application. The method can also include identifying a location of a current viewport for a first user device that is displaying part of the electronic document and providing to the first user device content items in or around the location of the viewport in the document, based on identifying one or more base layers to which the content items are anchored, as being in or around the location of the viewport.

In another implementation, a computer-implemented method for managing the display of items in a web-based document application is disclosed, and comprises accessing a data model for an electronic document, determining a size of a viewport for viewing a portion of the data model in a web browser, relative to a total size of a populated portion of the document, and generating for a document object model (DOM) an element that, when displayed in the browser, generates a scroll bar interface, and that has a scroll bar handle whose length is a function of the determined size of the viewport relative to the total size of the populated portion of the document. The element generated for the DOM can comprise a DIV element for displaying a scroll bar handle, and the method can further comprise determining that a size of the data model has increased, and generating a second element to replace the element generated for the DOM, wherein the second element is displayed smaller than the element generated for the DOM so as to indicate that the viewport represents a relatively smaller part of the data model. In some aspects, the viewport represents a portion of the model currently selected for display in the web browser.

In yet another implementation, a computer-implemented system for managing the display of items in a web-based document application is disclosed. The system includes computer memory storing a plurality of electronic document models that include textual and graphical elements; one or more view controllers programmed to generate for the electronic documents (a) sheet views that represent sub-portions of respective document models and include the textual elements, and (b) overlay views that include the graphical elements; and one or more document object model (DOM) generators programmed to produce DOM structures for rendering on web browsers, the DOM structures including islands that overlay a document and overlays that include the images that are attached to the islands. The DOM generators can be programmed to generate a fixed table that represents a border of a document and does not move when a user scrolls a viewport of the document, and a scrollable table that moves as the user scrolls the viewport of the document.

In some aspects, the islands can be attached to move with the document, and the images can be attached to move with the islands, and by extension, with the document when it is scrolled by a user. The system can also include one or more overlay containers generated by the DOM generator and containing one or more overlays that overlap a current viewport of the document. Also, the DOM generators can be programmed to select islands by determining which islands associated with a particular document model are currently within or near a viewport for the particular document model, and to select images for rendering in a DOM based on images identified as being attached to the selected islands. Moreover, the islands can be defined to have areas, and to not visually cover a document generated on a web-browser from the document model.

In certain implementations, one or more tangible computer-readable media may also be used to store instructions. The instructions, when executed, may perform operations like those discussed in this section above.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for managing how items, such as rich content items (e.g., graphs, digital images, and the like) in a spreadsheet are displayed and managed with respect to other items in the spreadsheet. In particular, a sub-portion of an entire spreadsheet model may be rendered to a DOM at any particular time, and the remainder of the model may be left un-rendered. The particular content that is currently shown on a display may be the portion that is rendered to the DOM (e.g., by converting formulas in a spreadsheet to literal values that are placed in an HTML table as text), or buffer zones around the current viewport may also be rendered so that a user can scroll slightly without needing to render any additional content into the DOM.

Certain rich items may be attached and anchored to one of multiple different cover layers that cover the model. The cover layers may be scrolled along with the spreadsheet, so that the items, or overlays, that are anchored to the overlays may appear to be anchored directly to the spreadsheet. The cover layers may be spaced periodically, such as every several hundred rows, so that all of the overlays in a model do not need to be addressed in rendering the model, and instead, only overlays on a cover layer that is near the current viewport need be handled by a system.

Figure 1:
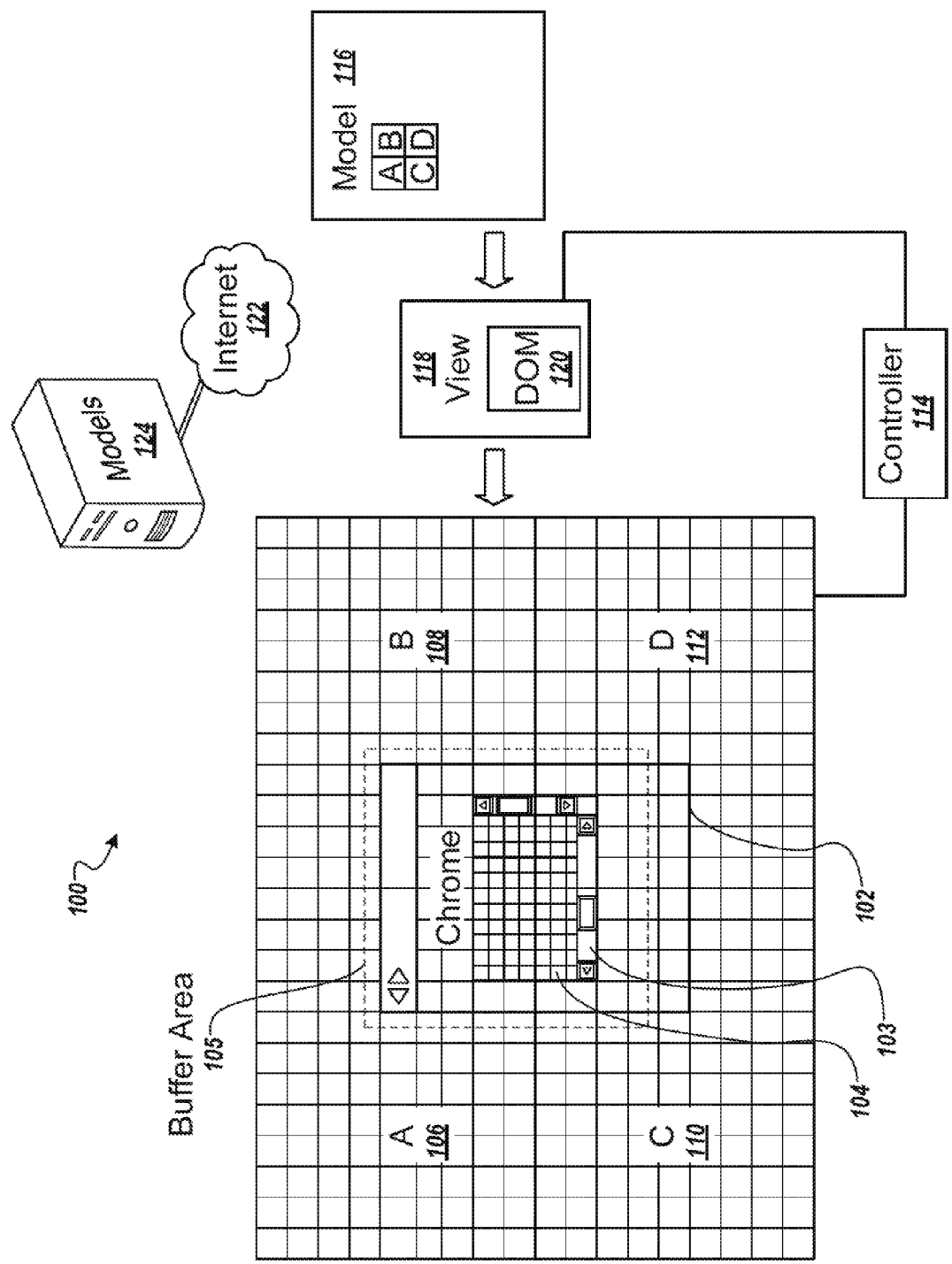
FIG. 1 is a conceptual diagram showing overlays applied to a rendering of a spreadsheet model.

FIG. 1 is a conceptual diagram showing overlays applied to a rendering of a spreadsheet model. In general, the system 100 shown here may be used to render very large documents in a web browser, or the web browser may be capable of showing only a very small portion of the large document at one time. As a result, the system 100 may select a sub-portion of an entire document to be displayed so as to not overload the browser that is displaying the document with an overly large document object model (DOM).

In the figure, the entire model is shown by a large grid, and a webpage 102 is shown superimposed over the top of the grid. The viewport 104 is superimposed over the middle of the webpage to represent the portion of the grid the user who is viewing the web page would see. As can be appreciated, the viewport 104 is substantially smaller than the entirety of the model. A buffer area 105 is shown generally surrounding the viewport 104 and can represent a portion of the model that the system 100 will render for display in the browser 102 at any particular time. Such rendering may involve a process of parsing a model for the spreadsheet, creating an HTML table element, creating literal values from the formulas and other items in the spreadsheet, and populating the table with those values. The buffer area 105 represents the fact that an area larger than just the viewport 104 may be rendered at any particular time for simplicity. Thus, if a user starts at the viewport 104 and scrolls slightly in one direction or the other, the revised display may be provided simply by a DOM itself, and additional rendering from the model need not occur.

Determining the relative positioning of various items in the spreadsheet may require determining the heights of various rows within the model. To obtain appropriate positioning, then, items such as images that are supposed to be displayed relative to particular cells in the spreadsheet or table, may need to be computed as being located a total distance from the top of the spreadsheet, which could require computation of row heights all the way from the top of the spreadsheet down to the current location in the spreadsheet. Such computation may occur, for example, by rendering formulas into HTML text, and then putting the text into an off screen div element, and taking horizontal and vertical measurements of the div element. The height of each row may then be the maximum height of any particular div element for a cell in the row that is measured in this manner. The total distance that an object is to be offset from the top of a spreadsheet may be the sum of all the row heights above the row in which the element is to be incorporated. Thus, using such an approach, it may be necessary to compute the height of all rows down to the location of the viewport, in order to obtain appropriate alignment of images or other rich objects that may be superimposed over the table or spreadsheet.

As another approach, the model for the spreadsheet may be broken up into a number of discrete subsections, such as subsections that repeat every 300 rows vertically in the spreadsheet. These subsections may each have associated with them an element that may be anchored to the table, so that the element moves with the table. Various rich items like those discussed here may then be anchored in turn to the element and may be positioned relative to the sub portion of the spreadsheet covered by that element, and may scroll with the element which in turn scrolls with the spreadsheet, so that, to a user, it appears that the items are themselves anchored directly to the spreadsheet.

In this figure, the particular elements have broken the spreadsheet up into four quadrants 106, 108, 110 and 112. In this particular example, the viewport 104 and the buffer area 105 span across all four of the quadrants. As a result, it may be necessary to determine row heights or otherwise conduct rendering for all of the elements in the quadrants. However, when the viewport 104 does not overlap with multiple quadrants, it may be sufficient merely to do computations or renderings for the single quadrant (or the quadrants) in which the viewport 104 is located.

Also shown on the webpage 102, is a pair of synthetic scroll bars 103. The scrollbars 103 may provide familiar functionality to a user of a spreadsheet application, such as by allowing the user to click on handles that slide in the scrollbars so as to scroll through a spreadsheet that is displayed in the viewport 104. The scroll bars 103 in this example may be constructed synthetically, in that they may be made by wrapping a scrollbar-size div element around an extremely large div. The overflow style may then be set in the correct direction to scroll, and the width or height of the inner DIV may be set so as to cause the scroll bar handle to scale to a proper size. The particular size may be determined by comparing the relative size of the viewport to the relative size of the document, or the part of the document that is populated, such as a rectangle in a spreadsheet that is defined by the outer bounds of cells in the spreadsheet that have content in them. In this manner, a proportional scrollbar effect may be achieved using synthetic elements, without a user understanding that the elements truly are synthetic. The system may then listen for an on scroll action, or in some browsers for mouse events, to determine when scrolling is occurring. In such situations, what is shown in the viewport 104 may be adjusted to correspond to such user input (e.g., by moving the div elements when the user clicks and drags on them).

Such user input may be identified by a controller 114 that intercepts and listens to various inputs in the system 100. For example, the controller 114 may recognize selections within a content area of the browser 102, and may also intercept keystrokes on a computing device that is displaying the spreadsheet. The controller may use such inputs to determine what changes have been made to the spreadsheet, and may translate those changes into updates provided to the document model 116. As can be seen in model 116, the four quadrants discussed before may, in appropriate circumstances, be only a small part of a larger model 116. Also, model 116 may itself be a small part of an even larger model that is stored in a models server 124, which may implement a hosted service that can be accessed over a network 122 such as the internet. The view that is displayed in the browser 102 may be generated via a view component 118 in a model-view-controller arrangement. For example, when rendering is to occur, the view 118 may identify a current position of the viewport 104 on the model, and may identify what cells are either in the viewport or else in the buffer area, that need to be rendered for a display to appear appropriately in the viewport 104. The view 118 may then construct a table element in a DOM 120 for the Web browser 102. The view 118 may then analyze formulas and other items from the relevant area of model 116, and may convert those elements to HTML elements that may be displayed conveniently in the browser 102. Such processes may be repeated each time a user makes an edit to the spreadsheet, or attempts to scroll through the spreadsheet to see other parts of the spreadsheet.

Figure 2A:
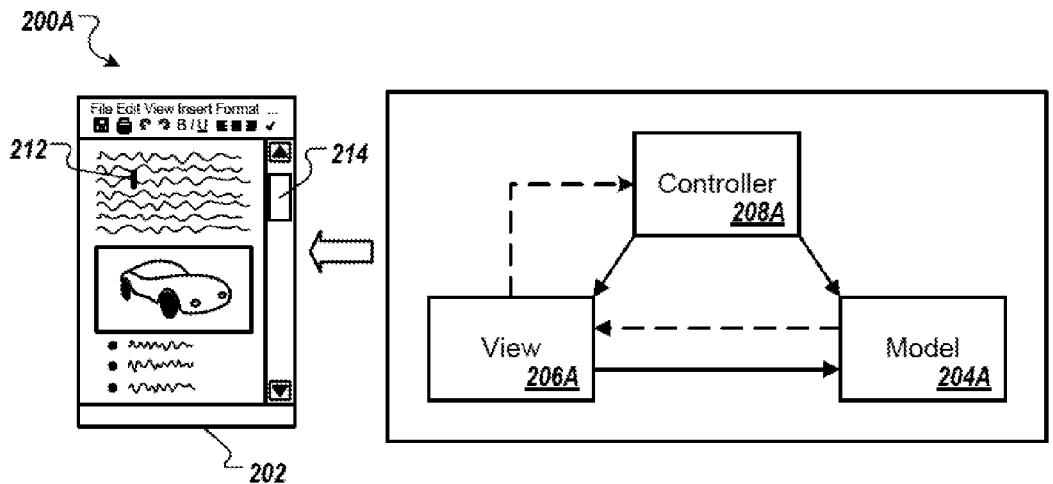
FIGS. 2A and 2B are block diagrams showing components of a model-view-controller implementation of a spreadsheet application.
Figure 2B:
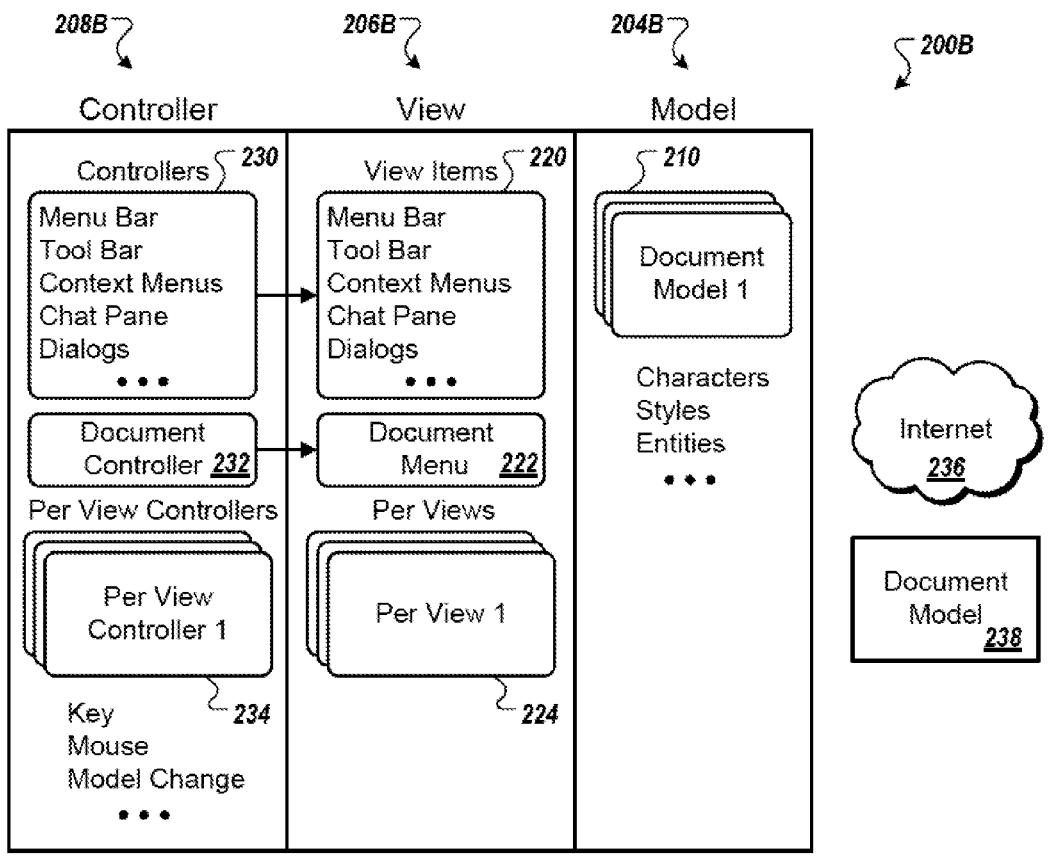

FIGS. 2A and 2B are block diagrams showing components of a model-view-controller (MVC) implementation of a spreadsheet application. For example, the spreadsheet application may be executed by a web browser, such as the web browser 102 shown in FIG. 1. In general, the MVC implementation provides for the download of a model from a remote server to a client, and the rendering of the client into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server.

Referring to FIG. 2A, a computer application 200A may be configured to display a spreadsheet document 202. The application 200A includes a model 204A, a view 206A, and a controller 208A. For example, the model 204A can contain a representation of the state of the spreadsheet document 202, including such elements as values, formats, formulas, frozen columns, hidden columns, frozen rows, hidden rows, and the like. The view 206A can represent a rendering of the current state of the model 204A. For example, the view 206A can be used for presenting to the user visual information that is associated with the spreadsheet document 202, such as user controls and spreadsheet data. The controller 208A can respond to changes in the model 204A or the view 206A, and can update the state of the model 204A and the view 206A. As shown in FIG. 2A, solid lines between the model 204A, the view 206A, and the controller 208A represent direct references between components, and dashed lines represent listeners. For example, by listening for user interaction (e.g., provided by user controls) with the presentation of the view 206A, the controller 208A can modify the model 204A, and can in turn modify the view 206A. As another example, by listening for changes in the model 204A made by another user in a collaborative environment or changes made through an automated data update or another such process, the view 206A can request re-rendering of an updated model or portion of the model. For example, if a user of a client device is only one of multiple users concurrently editing a document, characters and other edits by the other users may be passed to the client device from the server system, and the client code may add characters to the model in near real-time, and those changes can be passed into the DOM—so that each user can see the edits made by the other users very quickly.

Referring to FIG. 2B, the model-view-controller implementation as presented in FIG. 2A is shown with additional detail. As shown, a computer application 200B includes a model 204B (corresponding with the model 204A), a view 206B (corresponding with the view 206A), and a controller 208B (corresponding with the controller 208A).

The model 204B can include one or more sheet models 210. Each of the sheet models 210 can represent a separate spreadsheet in a collection of spreadsheet documents, for example, and can include a set of row models and column models. For example, the row models and the column models can be represented as arrays. Each of the sheet models 210 can further include a set of cell models. For example, the cell models can be represented as a sparsely populated two-dimensional array indexed by row and column ids. In some implementations, each of the sheet models 210 can include additional metadata, such as information related to frozen rows and columns, hidden rows and columns, merges, conditional formats, embedded object managers, maps of IDs to positions, and the like.

Each of the cell models can include a set of cell components. For example, each of the cell components can include information such as cell types, raw values, display values, format models, formula models, hyperlinks, data validation, conditional formatting, mutation methods, and view annotations (e.g., properties that may be cached on cell objects for lookup). In some implementations, each cell type (e.g., text, hyperlink, comment, and the like) may include an associated renderer that may convert the cell to an HTML/DOM (Hyper-Text Markup Language/Document Object Model) representation via rendering. Format models may include such properties as number formats, cell styling including colors and fonts, and the like. Formula models may also include formulas using R1C1 notation, and may include methods for formula conversion. Format models can be implemented using Cascading Style Sheet (CSS) classes, CSS class maps, and inline style objects, for example.

Formula models can be stored in a map on a client device, for example, so that cells may share references to the formulas. In some implementations, format models may also be stored in a map on a client device. In some implementations, cell models and format models may follow the NULL object pattern. For example, shared singleton objects may exist for a default blank cell and for a default blank format. Model data and components may be provided by a mega-model 238 (whose name indicates that the model is a super-set of the other models or views) that is stored on a remote server system via a connection to a network 236 (e.g., the internet).

The view 206B can include one or more view items 220 that may enable the user to interact with the application 200, such as menu bars, tool bars, context menus, chat panes, dialogs, and the like. The view 206B can also include a document or sheet menu 222 that presents information and control options related to one or more of the sheet models 210, and one or more of a set of per views 224. For example, one of the per views 224 may be associated with a corresponding one of the sheet models 210. Each of the per views 224 may include components or controls such as freezebars, resizers, selectors, active cell indicators, and navigation tools (e.g., scrollbars and the like).

The controller 208B can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth.

The controller 208B can also include a sheet controller 232 that may listen for and handle user interactions with the sheet menu 222. In addition, the controller 208B can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers, including the controller 208B, can transform user-generated events into model and view mutations. For example, based on a user action, a relevant controller (e.g., a controller configured for handling the action) may receive one or more events associated with the action and make transient changes to the view 206B before the user action is committed. Then, based on the event properties, the relevant controller can construct a command to mutate the model 204B, execute it, and send it to the remote server system that hosts the mega-model 238 via the network 236.

Many possible user interactions with the application 200B are possible, including interactions included in single-user sessions and in multiple-user sessions. For purposes of illustration, a series of example user interactions with the application 200B are described here. For example, to enter data into the spreadsheet document 202 (FIG. 2A), the user may proceed by using a computer mouse to select a desired spreadsheet cell by clicking on the cell. A mouse controller included in the per view controllers 234 (e.g., a per view controller associated with the active sheet of the document 202) can listen for an event associated with the mouse positioning input and the mouse click input, and upon intercepting it, can modify the view 206B (e.g., a per view associated with the active sheet) to provide the user with a visual indicator for the selection. For example, the selected spreadsheet cell may be highlighted, assigned a different border, assigned a different color, or another such modification.

Using a keyboard, the user may enter a desired value into the spreadsheet cell. A keyboard controller included in the per view controllers 234 can listen for events associated with the keyboard input, and upon intercepting them, can modify the view 206B to provide the user with a visual indicator for the input. For example, as the user types data into the spreadsheet cell, the cell may be visually updated to present the data to the user. Additionally, the keyboard controller can modify the model 204B to include entered data by writing the user input to the model. For example, one of the cell models 216 (e.g., a cell model associated with the spreadsheet cell 260) can be updated to include the entered data as the raw value. Additionally, the mega-model 238 may be updated to include the entered data, thus coordinating the model 204B with the mega-model 238. For example, changes to the model 204B may be transmitted to the mega-model 238 via a connection to the network 236. In some implementations, changes may be sent periodically (e.g., once every second, once every 10 seconds, once every minute, or another appropriate time interval). In some implementations, changes may be sent based on user activity (e.g., removing focus from a spreadsheet cell, clicking a save button, typing a character, or some other action).

Next, for example, the user may modify the formatting of data presented in the spreadsheet cell. By interacting with one of the view items 220 or with the sheet menu 222, the user can indicate a desired formatting change (e.g., a change such as changing regular numbers to currency, changing a font to bold, changing a color to blue, and the like). One of the controllers 230 or the sheet controller 232 can listen for user interaction with the view 206B, and upon detecting the interaction, can modify the model 204B to include the formatting change. For example, one of the cell models (e.g., the cell model associated with the spreadsheet cell) can be updated to include the change. A model change controller included in the per view controllers 234 can listen for events associated with the model 204B and can send a request to the view 206B to update accordingly (e.g., by rendering a display value included in the cell model associated with the spreadsheet cell). In some implementations, the model change controller may also handle model change events that result from collaborative model changes.

Additionally, for example, the user may associate the spreadsheet cell with a formula. Model-view-controller interactions within the application 200B for entering the formula and associating the formula with the spreadsheet cell may be generally similar as when modifying formatting. For example, a model change controller included in the per view controllers 234 can detect the model change associated with the entered formula, and can send a request to the view 206B to perform a display update. As part of the display update, for example, the view 206B may convert the entered formula to a literal value, and may render the spreadsheet cell to include the literal value.

Particular steps may be taken to permit a user to interact with a formula for a cell when the view might only include a literal value for the cell. In such a situation, a text entry area or box may be displayed adjacent to a viewport on a browser, and when a user places a cursor over a particular cell, the model data for the cell may be obtained and provided in the text entry area, while the literal value is shown in the cell in the viewport. As the user changes the formula, that change may be propagate to the model on the client (with changes to downstream cells) and may be rendered back into the DOM.

The user may also elect to view a different portion of the spreadsheet document 202 than they are currently viewing in the viewport. For example, by interacting with a scrollbar that is associated with the spreadsheet document, the user may indicate a desire to view spreadsheet data beyond the current view. One of the per view controllers 234 (e.g., the per view controller associated with the active sheet) can listen for user interaction with the view 206B or other appropriate component (e.g., the visual portion of the scrollbar), and upon detecting the interaction (e.g., via a computer mouse), can request for the view 206B to redraw itself. If the user specifies a small amount of scrolling, the view 206B may cause itself to be displayed by the browser. For example, a buffer area of cells may be maintained in the model 204B around the cells displayed in the visible area of the spreadsheet document 202. If the amount of scrolling specified by the user is determined by the view 206B to be within the bounds of the buffer area of cells, the spreadsheet cells may be rendered using the cached data. If the user specifies a larger amount of scrolling, such that the scrolling specified by the user is determined by the view 206B to be outside of the bounds of the buffer area of cells, for example, additional spreadsheet data from the mega-model 238 may be downloaded via the network 236. Thus, the model 204B may be updated with information related to additional spreadsheet cells, and the spreadsheet cells may be rendered using the downloaded data.

Figure 2C:
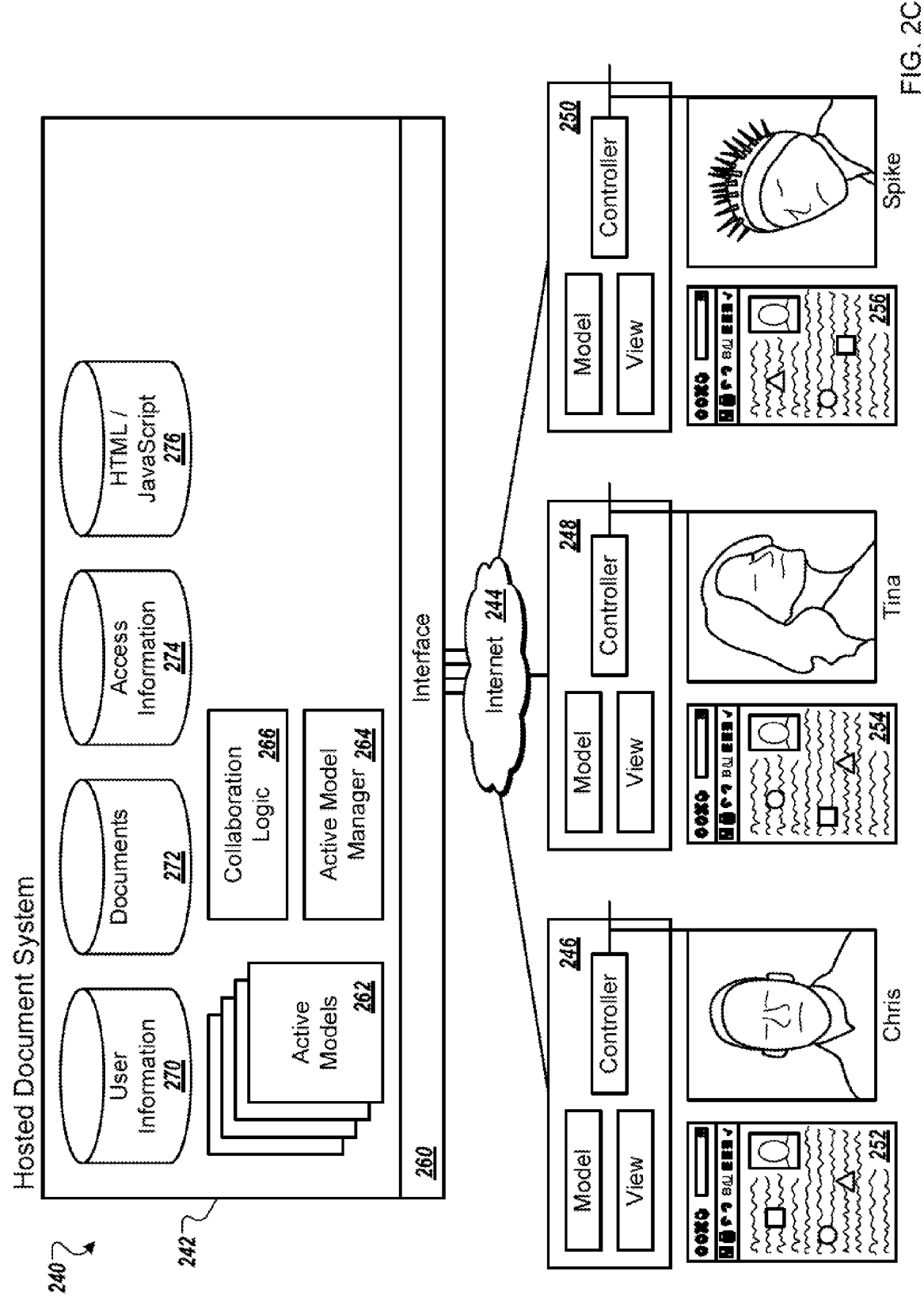
FIG. 2C is a block diagram of a system for permitting collaborative editing of a documented by multiple users through a hosted server system.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browsers as shown in FIG. 1 or FIG. 2A), and may include model, view, and controller components (e.g., similar to the application 200A/200B, shown in FIGS. 2A and 2B). The applications 246, 248, and 250 may be configured to execute computer code (e.g., JavaScript and other code running in a web browser) to display a document (e.g., word processing or spreadsheet) interface and to perform document functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate such protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing or spreadsheet documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242 (essentially administrator privileges for the document). As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group that includes the users, and the access privileges may be applied across the users in the group. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single-user sessions and in multiple-user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browsers 254, 256 for executing an online word processor. The browsers can include a portion of the HTML/JavaScript 276, and the browser applications 248, 250 can render chrome associated with the application, and can display the applications.

Additionally, an active model manager 264 included in the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a squares, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 500 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed (e.g., using a screen name of the other user), so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. However, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Figure 2D:
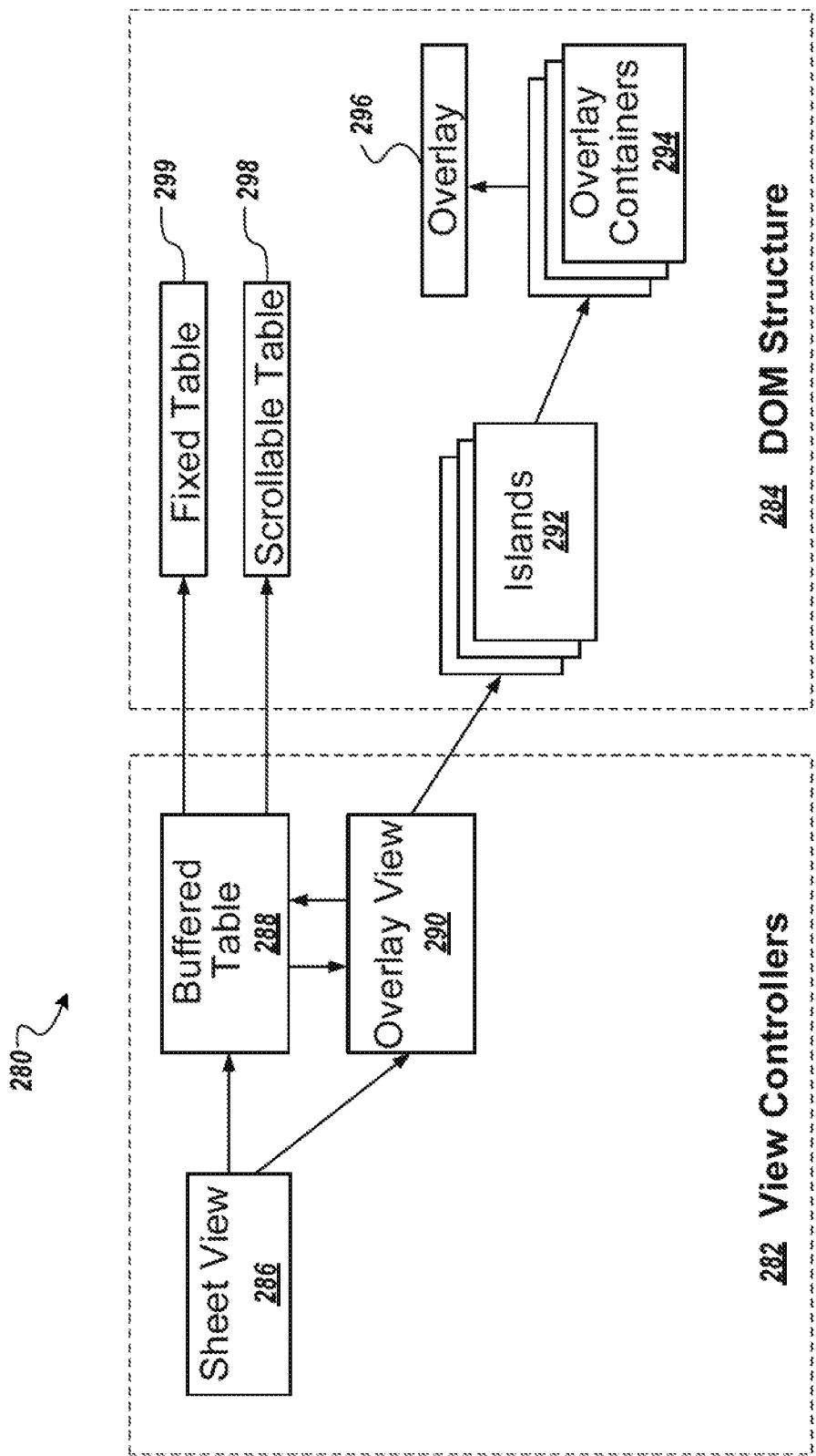
FIG. 2D is a block diagram of a views and DOM structures for implementing a browser-based spreadsheet.

Thus, the system shown in FIG. 2C may handle collaborative editing of a hosted document by multiple users at one time. The management of such editing can involve a low amount of data passing between the various sub-systems in the system FIG. 2D is a block diagram of views controllers 282 and DOM structures 284 for implementing a browser-based spreadsheet system 280. In general, the view controllers 282 represent views associated with a large-format spreadsheet, and may be used to populate a DOM structure 284 in ways shown here. The structures shown here may be used to display basic document content, such as text, in coordination with more complex document context such as figures and animations, by attaching the more complex content to one or more overlays that each lie over part of, and are in turn attached to a particular location, of the underlying document.

Starting with the sheet view 286, which represents a viewport or slice of the current spreadsheet model which is displayed to the user (perhaps with additional buffer area that is around that currently shown to the user), instead of the entire sheet all once. The sheet view 286 feeds into a buffered table 288 and an overlay view 290. The buffered table 288 represents the cells of the spreadsheet itself, and may be represented as formulas along with formatting information for those cells. The overlay view 290 presents additional items that would not traditionally be acceptable to be placed within a table, such as digital images and the like. The overlay view 290 may manage the manner in which such objects are rendered into the DOM structure 284 in relation to the buffered table 288.

When rendering, the buffered table 288 is used to create two different table elements in the DOM structure 284. First, a fixed table 299 implements frozen cells that may be at the top or to one side of a spreadsheet, whereas scrollable table 298 implements the portion of the spreadsheet that can be moved by a user.

Islands 292 correspond to cover layers discussed above, and there may be multiple islands 292 in a particular DOM structure. The number of islands generally is a function of how close the current viewport is to an intersection point of multiple islands, and a relative size of the islands to the sides of the viewport. Thus, if the islands are chosen to be particularly large, while the viewport is particularly small, fewer islands may be implemented in the DOM structure 284 in order to render that portion of a spreadsheet, because the viewport is not likely to be near the intersection of two or more islands.

Attached to the islands 292 are a variety of overlays 296 which may be contained in overlay containers 294. The overlays may include, for example, digital images, graphs, and other objects that are desired to be visually located on a surface of a spreadsheet. The overlays 296 may thus be anchored each to a particular island 292, and the islands of course may be anchored to the spreadsheet table. As a result, each of the items may scroll together when a user scrolls the spreadsheet. In this manner, more complex items such as images may be displayed relative to other simpler items such as text, and the relative positioning of the different types of items may be maintained even as the spreadsheet is scrolled and edited by a user.

Figure 3A:
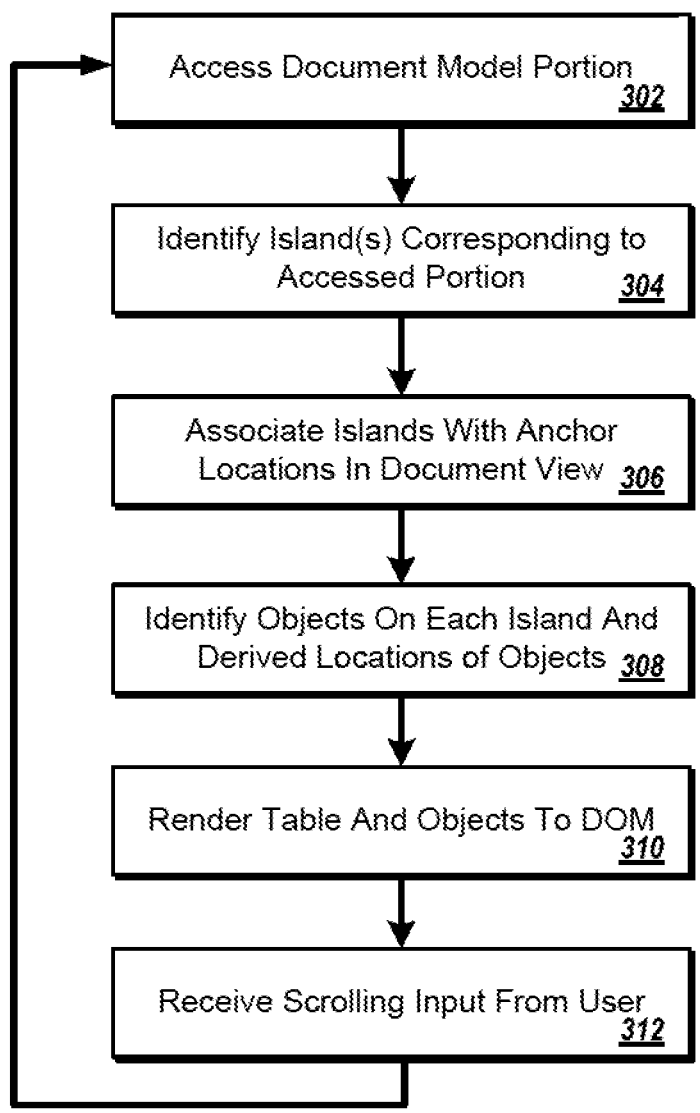
FIG. 3A is a flow chart of an example process for positioning objects in a spreadsheet when a user is scrolling in the spreadsheet.

FIG. 3A is a flow chart of an example process for positioning objects in a spreadsheet when a user is scrolling in the spreadsheet. In general, the process involves identifying objects that are placed on islands over a spreadsheet when scrolling occurs, so that those items may be scrolled an appropriate manner relative to the spreadsheet.

The process begins at box 302, where a portion of a document model is accessed. That portion may be selected as a particular area of, or buffer area around, a current viewport in an application. At box 304, islands that correspond to the accessed portion are identified. For example, each island may be associated with a particular sub-area of a spreadsheet, and definitions of such assignments may be reviewed in order to determine which islands, if any, currently overlap with the model portion that has been accessed.

At box 306, the islands are associated with anchor locations in the document view. For example, the anchor locations may be one of the corners in the rectangle or square that represents the coverage for a particular island. The islands can simply be elements that are a point in size and are located at the anchor location. Alternatively, the islands may be larger in size (e.g., they may cover the entire sub-area to which they are assigned) but may be made invisible such as by generating the islands as transparent elements.

At box 308, the process identifies objects on each island in the derived locations for those objects. For example, an object may be located a certain distance from an anchor point for an island. It may be possible to determine where that object sits relative to the spreadsheet by adding the relative location of the object compared to the island anchor point to the relative location of the island anchor point, so as to generate an absolute location on the spreadsheet for the object.

At box 310, the table and relevant objects are rendered to the DOM, such as in manners discussed above and below. For example, a table may be generated and may be populated with content from the spreadsheet model, such as by carrying out calculations in the spreadsheet cells to generate HTML for those cells in providing the HTML to the DOM. Finally, at box 312 scrolling input from the user is received by the process. Such input may be correlated to an amount of scrolling in a particular direction, so that a certain integer number may be added or subtracted to identify a new location for the viewport 104. When such a new location is identified, the process may again start over, by accessing a new portion of the document model for rendering, and potentially accessing additional islands or other structures so as to provide for the rendering of rich content in the spreadsheet.

Figure 3B:
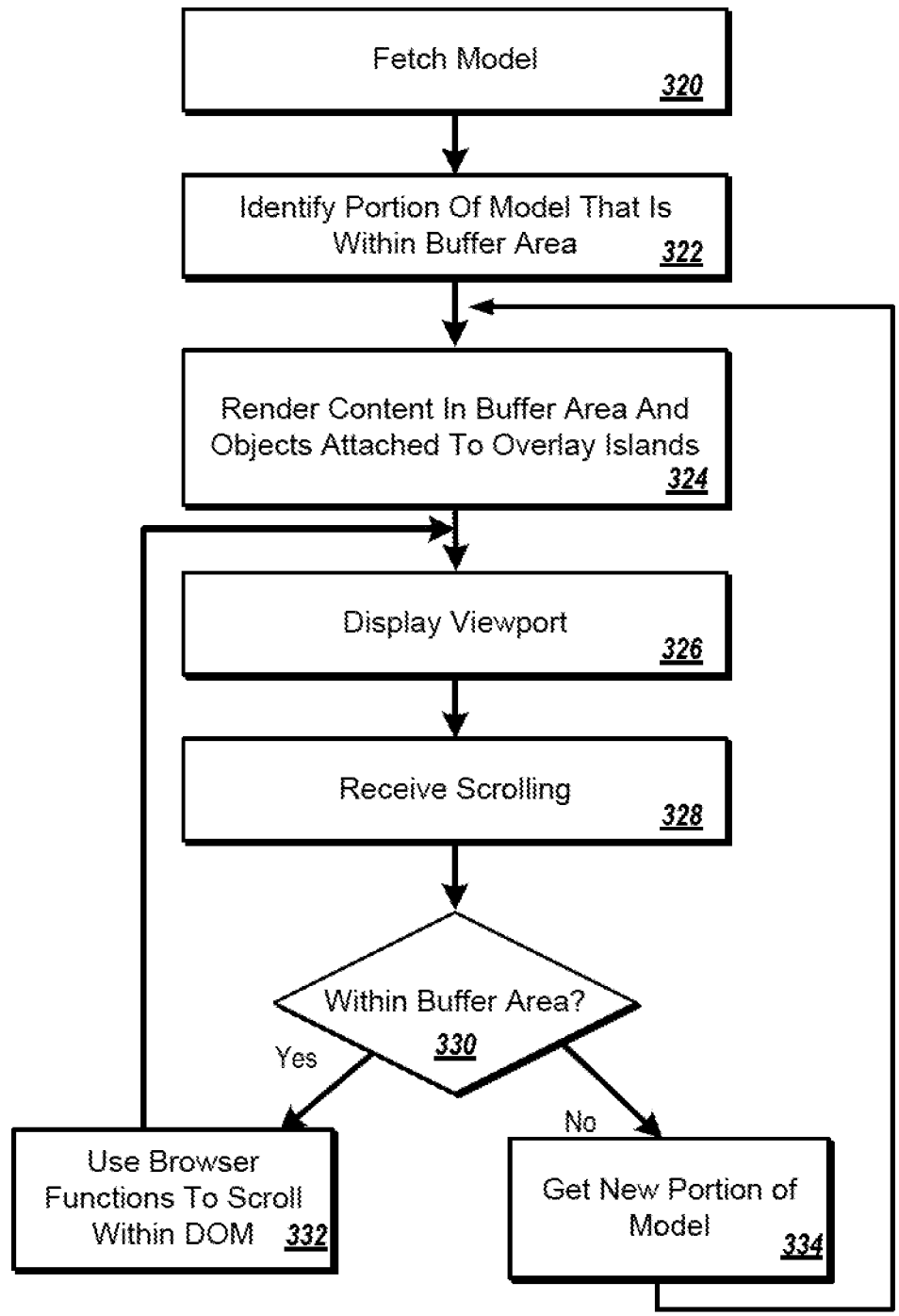
FIG. 3B is a flow chart of a process for rendering a spreadsheet model as a user scrolls within the model.

FIG. 3B is a flow chart of a process for rendering a spreadsheet model as a user scrolls within the model. In general, the process involves actions that a client computer may take when a user of a browser-based spreadsheet application scrolls within the spreadsheet that is displayed to the user.

At box 320, the process starts by fetching a model, such as by obtaining a subset of modeling information for a very large spreadsheet, from a central hosted server system. At box 322, the process identifies the portion of the model that is within a buffer area, which is explained above, and may be an area a certain distance around a current viewport for an application. Thus, for example, a very large model may be saved at a central server system, a subsection of that model may be downloaded to a client device, and a subsection further yet may be rendered into a DOM.

At box 324, the process renders content in the buffer area into the DOM and also renders objects that are attached to an overlay on islands that are associated with particular portions of the spreadsheet that has been rendered. Thus, for example, if three digital images were attached to a particular island that the viewport is currently centered on, those three images may be rendered and provided to the DOM along with the relevant locations at which to display the images.

At box 326, the viewport is displayed with the information that is added to the DOM, though certain buffer area elements may not be displayed. At box 328, the process receives scrolling input from a user, such as by the user dragging on proportional scroll bars that have been synthetically created in manners like that discussed above. At box 330, the process checks whether the scrolling is maintained within the buffer area, and if it is, the browser's functions are simply used to scroll within the DOM (box 332). After the scrolling, the process may update the viewport and again wait to receive scrolling or other input. If the viewport is not within the buffer area, a new portion of the model may be obtained (box 334), and that new portion may be rendered into the DOM, and the display of the viewport may be updated.

Figure 3C:
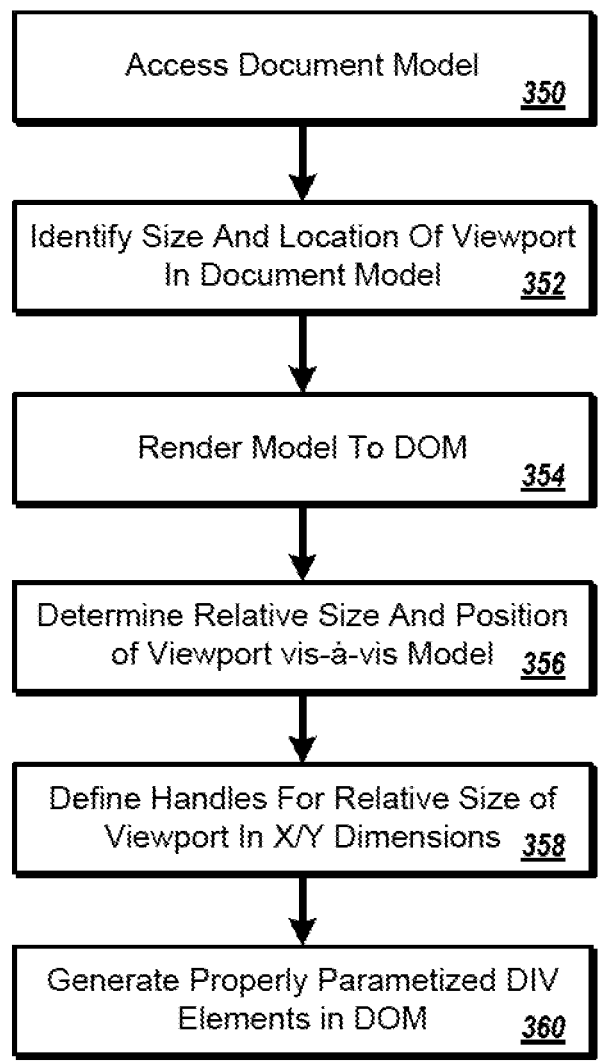
FIG. 3C is a flow chart of a process for generating synthetic proportional scroll bars for a spreadsheet application in a browser.

FIG. 3C is a flow chart of a process for generating synthetic proportional scroll bars for a spreadsheet application in a browser. In general, the process involves steps that may be taken to construct synthetic scrollbars that look like real scrollbars and that a user can interact with in a web-based application. The process begins at box 350, where a document model is accessed. At box 352, the process identifies the size and location of a viewport in the document model, and may also determine the relative size of the viewport or approximate relative size compared to the overall model. At box 354, the model is rendered into the DOM or at least the relevant portion of the model is rendered into the DOM.

At box 356, to the extent the process has not previously done so, it may determine a relative size and position of the viewport as compared to the entire model. At box 358 the process may define handles for the relative size of the viewport in the X and Y dimensions. If the model is capable of fitting within the viewport in one of those dimensions, then only one scrollbar may be defined. In any event, the size of the handles in the scrollbars may be a function of the relative size of the viewport to the overall model, so that when the viewport gets smaller or the model gets larger the handles shrink in size to represent that what is being displayed is only a small part of the overall model. Also the locations of the handles within their sliding channels may be affected based on where in the model the current viewport is located. For example, if the viewport is located in the lower right corner of the model, then the handles may be displayed at the bottom and the right of their respective channels.

At box 360, the process ends by generating properly parameterized elements in the DOM for the synthetic scrollbars. For example, the height and width of the scrollbars may be selected to provide a visually appealing and familiar manner of displaying scrollbars (e.g., where the handles shrink when the viewport is a smaller part of the overall model).

Figure 4:
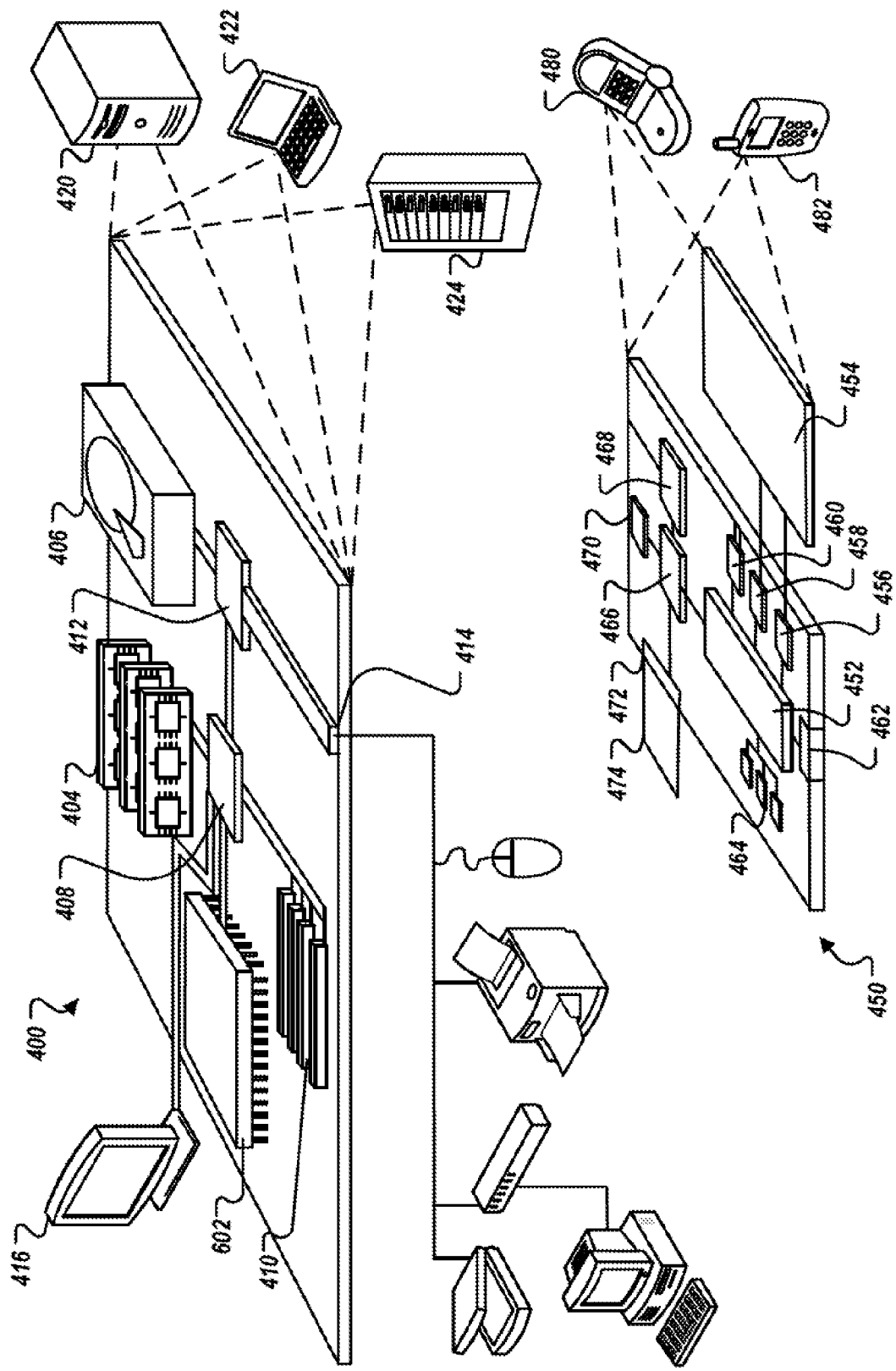
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to spreadsheet and word processing documents, but other forms of documents may also be addressed, such as news feeds, presentations, and the like. Also, content of documents may be identified by the system, and promotional materials may be served to be displayed on client devices, where the promotional material is targeted using the content of documents that are being edited by the system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for managing display of items in a web-based document application, the method comprising:
   providing an electronic spreadsheet document that includes a plurality of content items;
   accessing a data model for the electronic spreadsheet document;
   identifying a viewport for viewing a portion of the data model in a web browser;
   anchoring a plurality of base layers to different discrete positions of the electronic spreadsheet document, wherein particular ones of the plurality of base layers overlap at least the portion of the data model;
   anchoring ones of the plurality of content items to the particular ones of the plurality of base layers, wherein each of the particular ones of the plurality of base layers are attached to a particular anchor location of the electronic spreadsheet document, so that when the electronic spreadsheet document is scrolled on a computer display, the ones of the plurality of content items move with the electronic spreadsheet document by virtue of the anchoring of the ones of the plurality of content items to the particular ones of the base layers and the anchoring of the plurality of base layers to the different discrete positions of the electronic spreadsheet document;
   rendering to a document object model the ones of the plurality of content items;
   attaching a plurality of islands, in a document object model structure, to a plurality of overlays associated with the ones of the plurality of content items such that each of the plurality of overlays is anchored to a particular island of the plurality of islands; and
   anchoring the plurality of islands to a sub-area of the data model to provide display of the ones of the plurality of content items in the electronic spreadsheet document while scrolling.

2. The method of claim 1, further comprising rendering content items that are anchored to base layers that cover the sub-area.

3. The method of claim 1, wherein the sub-area is identified by selecting an area positionally around the viewport that shows a small portion of the electronic spreadsheet document in a web browser.

4. The method of claim 1, wherein the ones of the plurality of base layers cover an area and are rendered as transparent objects over a rendered version of the electronic spreadsheet document.

5. The method of claim 1, wherein the ones of the plurality of base layers are arranged to pan with the electronic spreadsheet document when a user of a computing device moves the electronic spreadsheet document within the viewport in a user application.

6. The method of claim 1, further comprising identifying a location of the viewport for a first user device that is displaying part of the electronic spreadsheet document and providing to the first user device content items in or around the location of the viewport in the electronic spreadsheet document, based on identifying one or more base layers to which the content items are anchored, as being in or around the location of the viewport.

7. A computer-implemented method for managing the display of items in a web-based document application, the method comprising:
   accessing a data model for an electronic spreadsheet document;
   determining a size of a viewport for viewing a portion of the data model in a web browser, relative to a total size of a populated portion of the electronic spreadsheet document;
   anchoring a plurality of base layers to different discrete positions of the electronic spreadsheet document, wherein particular ones of the plurality of base layers overlap at least the portion of the data model;
   anchoring ones of the plurality of content items to the particular ones of the plurality of base layers, wherein each of the particular ones of the plurality of base layers are attached to a particular anchor location of the electronic spreadsheet document;

generating for a document object model (DOM) an element that, when displayed in the web browser, generates a scroll bar interface, and that has a scroll bar handle whose length is a function of the size of the viewport relative to the total size of the populated portion of the electronic spreadsheet document;

rendering to the DOM the ones of the plurality of content items;

attaching a plurality of islands, in a document object model structure, to a plurality of overlays associated with the ones of the plurality of content items such that each of the plurality of overlays is anchored to a particular island of the plurality of islands; and anchoring the plurality of islands to a sub-area of the data model to provide display of the ones of the plurality of content items in the electronic spreadsheet document while scrolling;

wherein when the electronic spreadsheet document is scrolled on a computer display, moving the ones of the plurality of content items with the electronic spreadsheet document by virtue of the anchoring of the ones of the plurality of content items to the particular ones of the base layers and the anchoring of the plurality of base layers to the different discrete positions of the electronic spreadsheet document.

8. The method of claim 7, wherein the element generated for the DOM comprises a DIV element for displaying the scroll bar handle.

9. The method of claim 7, further comprising determining that a size of the data model has increased, and generating a second element to replace the element generated for the DOM, wherein the second element is displayed smaller than the element generated for the DOM so as to indicate that the viewport represents a relatively smaller part of the data model.

10. The method of claim 7, wherein the viewport represents a portion of the model currently selected for display in the web browser.

11. A computer-implemented system for managing the display of items in a web-based document application, the system comprising:

computer memory storing a plurality of electronic document models that include textual and graphical elements;

one or more view controllers programmed to generate for the plurality of electronic document models (a) sheet views that represent sub-portions of respective electronic document models and include the textual elements, and (b) overlay views that include the graphical elements; and one or more document object model (DOM) generators programmed to produce DOM structures for rendering on web browsers, the DOM structures including a plurality of islands that overlay an electronic spreadsheet document and a plurality of overlays that include the graphical elements that are attached to the plurality of islands, wherein the plurality of overlays are attached to the plurality of islands, in the DOM structures, such that each of the plurality of overlays is anchored to a particular island of the plurality of islands and the plurality of islands are anchored to at least a sub-portion of an electronic document model to provide display of the ones of the plurality of overlays in the electronic spreadsheet document while scrolling, and wherein the plurality of islands are associated with anchor locations in the sheet views.

12. The system of claim 11, wherein the DOM generators are programmed to generate a fixed table that represents a border of the electronic spreadsheet document and does not move when a user scrolls a viewport of the electronic spreadsheet document, and a scrollable table that moves as the user scrolls the viewport of the electronic spreadsheet document.

13. The system of claim 11, wherein the plurality of islands are attached to move with the electronic spreadsheet document, and the graphical elements are attached to move with the plurality of islands, and by extension, with the electronic spreadsheet document when it is scrolled by a user.

14. The system of claim 11, further comprising one or more overlay containers generated by the DOM generator and containing one or more overlays that overlap a current viewport of the electronic spreadsheet document.

15. The system of claim 11, wherein the DOM generators are programmed to select islands by determining which islands associated with a particular document model are currently within or near a viewport for the particular document model, and to select images for rendering in a DOM based on images identified as being attached to the islands associated with the particular document model currently within or near the viewport for the particular document model.

16. The system of claim 11, wherein the plurality of islands are defined to have areas, and the plurality of islands do not visually cover the electronic spreadsheet document generated on a web-browser from one of the plurality of electronic document models.

17. One or more non-transitory computer-readable media storing instructions that, when executed, perform operations comprising:

providing an electronic spreadsheet document that includes a plurality of content items;

accessing a data model for the electronic spreadsheet document;

identifying a viewport for viewing a portion of the data model in a web browser;

anchoring a plurality of base layers to different discrete positions of the electronic spreadsheet document, wherein particular ones of the plurality of base layers overlap at least the portion of the data model;

anchoring ones of the plurality of content items to the particular ones of the plurality of base layers, wherein each of the particular ones of the plurality of base layers are attached to a particular anchor location of the electronic spreadsheet document, so that when the electronic spreadsheet document is scrolled on a computer display, the content items move with the electronic spreadsheet document by virtue of the anchoring of the ones of the plurality of content items to the particular ones of the base layers and the anchoring of the plurality of base layers to the different discrete positions of the electronic spreadsheet document;

rendering to a document object model the ones of the plurality of content items;

attaching a plurality of islands, in a document object model structure, to a plurality of overlays associated with the ones of the plurality of content items such that each of the plurality of overlays is anchored to a particular island of the plurality of islands; and anchoring the plurality of islands to a sub-area of the data model to provide display of the ones of the plurality of content items in the electronic spreadsheet document while scrolling.

18. The non-transitory computer readable media of claim 17, wherein the operations further comprise rendering content items that are anchored to base layers that cover the sub-area.

19. The non-transitory computer readable media of claim 17, wherein the ones of the plurality of base layers are arranged to pan with the electronic spreadsheet document when a user of a computing device moves the electronic spreadsheet document within the viewport in a user application.

20. The non-transitory computer readable media of claim 17, wherein the operations further comprise identifying a location of the viewport for a first user device that is displaying part of the electronic spreadsheet document and providing to the first user device content items in or around the location of the viewport in the electronic spreadsheet document, based on identifying one or more base layers to which the content items are anchored, as being in or around the location of the viewport.

21. One or more non-transitory computer-readable media storing instructions that, when executed, perform operations comprising:
  accessing a data model for an electronic spreadsheet document;
  determining a size of a viewport for viewing a portion of the data model in a web browser, relative to a total size of a populated portion of the electronic spreadsheet document;
  anchoring a plurality of base layers to different discrete positions of the electronic spreadsheet document, wherein particular ones of the plurality of base layers overlap at least the portion of the data model;
  anchoring ones of the plurality of content items to the particular ones of the plurality of base layers, wherein each of the particular ones of the plurality of base layers are attached to a particular anchor location of the electronic spreadsheet document;
  generating for a document object model (DOM) an element that, when displayed in the browser, generates a scroll bar interface, and that has a scroll bar handle whose length is a function of the determined size of the viewport relative to the total size of the populated portion of the electronic spreadsheet document;
  rendering to the DOM the ones of the plurality of content items;
  attaching a plurality of islands, in a document object model structure, to a plurality of overlays associated with the ones of the plurality of content items such that each of the plurality of overlays is anchored to a particular island of the plurality of islands; and
  anchoring the plurality of islands to a sub-area of the data model to provide display of the ones of the plurality of content items in the electronic spreadsheet document while scrolling;
  wherein when the electronic spreadsheet document is scrolled on a computer display, moving the ones of the plurality of content items with the electronic spreadsheet document by virtue of the anchoring of the ones of the plurality of content items to the particular ones of the base layers and the anchoring of the plurality of base layers to the different discrete positions of the electronic spreadsheet document.

22. The non-transitory computer readable media of claim 21, wherein the element generated for the DOM comprises a DIV element for displaying the scroll bar handle.

23. The non-transitory computer readable media of claim 21, wherein the operations further comprise determining that a size of the data model has increased, and generating a second element to replace the element generated for the DOM, wherein the second element is displayed smaller than the element generated for the DOM so as to indicate that the viewport represents a relatively smaller part of the data model.

* * * * *